United States Patent
Diehl

(10) Patent No.: US 12,242,420 B2
(45) Date of Patent: Mar. 4, 2025

(54) FIXITY DATA PROCESSING

(71) Applicants: Sony Group Corporation, Tokyo (JP); Sony Pictures Entertainment Inc., Culver City, CA (US)

(72) Inventor: Eric Diehl, Burbank, CA (US)

(73) Assignees: SONY GROUP CORPORATION, Tokyo (JP); SONY PICTURES ENTERTAINMENT INC., Culver City, CA (US)

( * ) Notice: Subject to any disclaimer, the term of this patent is extended or adjusted under 35 U.S.C. 154(b) by 361 days.

(21) Appl. No.: 17/697,346

(22) Filed: Mar. 17, 2022

(65) Prior Publication Data

US 2022/0300452 A1 Sep. 22, 2022

Related U.S. Application Data

(60) Provisional application No. 63/162,810, filed on Mar. 18, 2021.

(51) Int. Cl.
  *G06F 16/13* (2019.01)
  *H04L 9/08* (2006.01)
  *H04L 9/32* (2006.01)
  *H04L 9/00* (2022.01)

(52) U.S. Cl.
  CPC .......... *G06F 16/137* (2019.01); *H04L 9/0825* (2013.01); *H04L 9/3236* (2013.01); *H04L 9/3247* (2013.01); *H04L 9/50* (2022.05)

(58) Field of Classification Search
  None
  See application file for complete search history.

(56) References Cited

U.S. PATENT DOCUMENTS

| | | |
|---|---|---|
| 2005/0066169 A1 | 3/2005 | Kiehtreiber |
| 2006/0066169 A1 | 3/2006 | Daugherty et al. |
| 2016/0378772 A1 | 12/2016 | Hostetter |

(Continued)

FOREIGN PATENT DOCUMENTS

| | | |
|---|---|---|
| JP | 2006053836 A | 2/2006 |
| JP | 2007506187 A | 3/2007 |

(Continued)

OTHER PUBLICATIONS

International Search Report, ISA/US, in corresponding PCT/US2022/21002, dated Jun. 25, 2022, 12 pgs.

(Continued)

*Primary Examiner* — Eddy Cheung
(74) *Attorney, Agent, or Firm* — Procopio, Cory, Hargreaves & Savitch LLP

(57) ABSTRACT

Fixity data processing of a file by an ingester, including: receiving and processing the file by slicing the file into a plurality of parts; calculating a digest of each part until digests of all of the plurality of parts have been calculated; calculating a master hash as a combination of the digests of all of the plurality of parts; calculating a master hash signature using the master hash and a private key of the ingester; forming a fixity data including a set of digests which includes digests of all of the plurality of parts, the master hash, the master hash signature, and a public key of the ingester; sending the fixity data to a verifier; and storing, in a trusted database, a fixity metadata including the master hash, the master hash signature, the public key of the ingester, and an identifier of the file.

16 Claims, 7 Drawing Sheets

(56) References Cited

U.S. PATENT DOCUMENTS

| | | |
|---|---|---|
| 2018/0115428 A1 | 4/2018 | Lysenko et al. |
| 2020/0201964 A1 | 6/2020 | Nandakumar |
| 2021/0019418 A1 | 1/2021 | Peeters |
| 2021/0075623 A1 | 3/2021 | Petersen |

FOREIGN PATENT DOCUMENTS

| | | |
|---|---|---|
| JP | 2017204706 A | 11/2017 |
| WO | WO-2005029223 A2 | 3/2005 |
| WO | WO-2022198078 A1 | 9/2022 |

OTHER PUBLICATIONS

Mohamed Aturban et al., Archive Assisted Archival Fixity Verification Framework, Old Dominion University, Norfolk, VA.

FIXITY DATA PROCESSING

CROSS-REFERENCE TO RELATED APPLICATIONS

This application claims the benefit of priority under 35 U.S.C. § 119(e) of U.S. Provisional Patent Application No. 63/162,810, filed Mar. 18, 2021, entitled "Blockchain-based Fixity". The disclosure of the above-referenced application is incorporated herein by reference.

BACKGROUND

Field

The present disclosure relates to fixity data, and more specifically, to verifying that a received file is a pristine copy of the same ingested file using the fixity data.

Background

Fixity aims to demonstrate that a stored file has not been altered involuntarily or voluntarily. Voluntary alteration corresponds to an attacker changing at least one bit of a file. Thus, a proper solution for fixity should: Provide trustable proof that a file has not been altered; All non-malicious alterations must be detected; Malicious alterations by outsiders must be detected; and Malicious alterations by non-trusted insiders must be detected. Trusted insiders are entities who are authorized to alter a file.

The current solutions calculate a hash or cryptographic hash for the complete file and store the corresponding hash in a database. However, when the stored file is large, using a hash for a large monolithic file is not efficient. Furthermore, hashing a large file is not compatible with modern cloud infrastructures that support multipart upload and download, where different parts of the file are concurrently uploaded and recombined at the storage level. Thus, using a current solution, an attacker may upload its forged file and register it in the trusted database (or distributed ledger).

SUMMARY

The present disclosure provides for verifying that a received file is a pristine copy of the same file that an ingester prepared.

In one implementation, a method for fixity data processing of a file by an ingester is disclosed. The method includes: receiving and processing the file by slicing the file into a plurality of parts; calculating a digest of each part until digests of all of the plurality of parts have been calculated; calculating a master hash as a combination of the digests of all of the plurality of parts; calculating a master hash signature using the master hash and the private key of the ingester; forming a fixity data including a set of digests which includes digests of all of the plurality of parts, the master hash, the master hash signature, and the public key of the ingester; sending the fixity data to a verifier; and storing, in a trusted database, a fixity metadata including the master hash, the master hash signature, the public key of the ingester, and an identifier of the file.

In one implementation, the method further includes first comparing the master hash in the fixity data with a combination of hash of each part; second comparing the master hash signature in the fixity data with a digital signature of the master hash calculated using the public key; third comparing a hash of each part with each of the set of digests; and declaring the file as pristine and not impaired when all three comparisons produce true results. In one implementation, the method further includes requesting to verify that the master hash signature of the fixity metadata stored in the trusted database matches the master hash signature in the fixity data. In one implementation, the first comparing includes determining whether $MH=\text{hash}(HR_1 | \ldots | HR_n)$ is true, wherein MH is the master hash and $HR_i$ is the digest stored in the trusted database of the $i^{th}$ part. In one implementation, the second comparing includes determining whether $\text{Versign}_{\{K_{pub}\}}(MH, SMH)$ is true, wherein $K_{pub}$ is the public key provided by fixity data, Versign is verification of digital signature. In one implementation, the third comparing includes determining whether $H_i=HR_i$ is true, wherein $H_i$ is the digest of each part and $HR_i$ is the digest stored in the trusted database of the $i^{th}$ part. In one implementation, the digest of each part is calculated as $\forall i \in \{1 \ldots n\}$, $H_i=\text{hash}(P_i)$, wherein hash( ) is a hash function. In one implementation, the master hash is calculated as $MH=\text{hash1}(H_1 | \ldots | H_n)$, wherein hash1( ) is a hash function and symbol | represents concatenating two parts. In one implementation, the master hash signature is calculated as $SMH=\text{Sign}_{\{K_{pri}\}}(MH)$, wherein $K_{pri}$ is the private key of the ingester, and Sign is a digital signature. In one implementation, the method further includes sending an inquiry to the trusted database to determine whether the master hash signature in the fixity data matches the master hash signature in the fixity metadata. In one implementation, the trusted database is a blockchain.

In another implementation, a fixity data system is disclosed. The system includes: an ingester including a public key and a private key, the ingester to receive and process a file by slicing the file into a plurality of parts; the ingester generating a fixity data including: a set of digests of the plurality of parts, a digest of each part calculated as hash of each part; a master hash calculated as a combination of the set of digests; a master hash signature calculated using the master hash and the private key; and the public key of the ingester; a trusted database to store a fixity metadata including the master hash, the master hash signature, the public key, and an identifier of the file.

In one implementation, the system further includes a verifier to receive and verify that the file has not been impaired by including: the master hash in the fixity data with a combination of hash of each part; the master hash signature in the fixity data with a digital signature of the master hash calculated using the public key; and a hash of each part with the digest of each part; wherein the file is declared as pristine and not impaired when all three comparisons produce true results. In one implementation, the verifier verifies that the master hash signature in the fixity data matches the master hash signature of the fixity metadata stored in the trusted database, wherein the trusted database is a blockchain.

In another implementation, method for verifying that a file is a pristine copy of a same file that an ingester prepared is disclosed. The method includes: receiving a plurality of parts of the file; receiving a fixity data including a set of digests of a plurality of parts, a master hash, a master hash signature, and a public key of the ingester; first comparing the master hash in the fixity data with a combination of hash of each part; second comparing the master hash signature in the fixity data with a digital signature of the master hash calculated using the public key of the ingester; third comparing a hash of each part with each digest; and declaring the file as pristine and not impaired when all three comparisons produce true results.

In one implementation, the plurality of parts of the file is generated by slicing the file into parts. In one implementation, each digest of the set of digests is calculated as hash of each part. In one implementation, the master hash is calculated as a combination of the set of digests. In one implementation, the master hash is calculated as MH=hash1($H_1$| . . . |$H_n$), wherein hash1( ) is a hash function and symbol | represents concatenating two parts. In one implementation, the master hash signature is calculated using the master hash and a private key of the ingester. In one implementation, the master hash signature is calculated as SMH=Sign$_{\{K_{pri}\}}$(MH), wherein $K_{pri}$ is the private key of the ingester, and Sign is a digital signature.

Other features and advantages should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

As described above, the current solutions for a fixity issue calculate a hash or cryptographic hash for the complete file and store the corresponding hash in a database. In some cases, the database is a blockchain. The use of a blockchain enforces the immutability of the stored hash. However, when the stored file is large, using a hash for a large monolithic file is not efficient and may be subject to forging of the file by an attacker. For example, in a cloud infrastructure that supports multipart upload and download, different parts of the file are concurrently uploaded and recombined at the storage level. Thus, in this infrastructure, an attacker may upload its forged file and register it in the trusted database.

Certain implementations of the present disclosure include a verification process to verify that the file is pristine (i.e., that a received file is a pristine copy of the same file that an ingester prepared). After reading below descriptions, it will become apparent how to implement the disclosure in various implementations and applications. Although various implementations of the present disclosure will be described herein, it is understood that these implementations are presented by way of example only, and not limitation. As such, the detailed description of various implementations should not be construed to limit the scope or breadth of the present disclosure.

Figure 1:
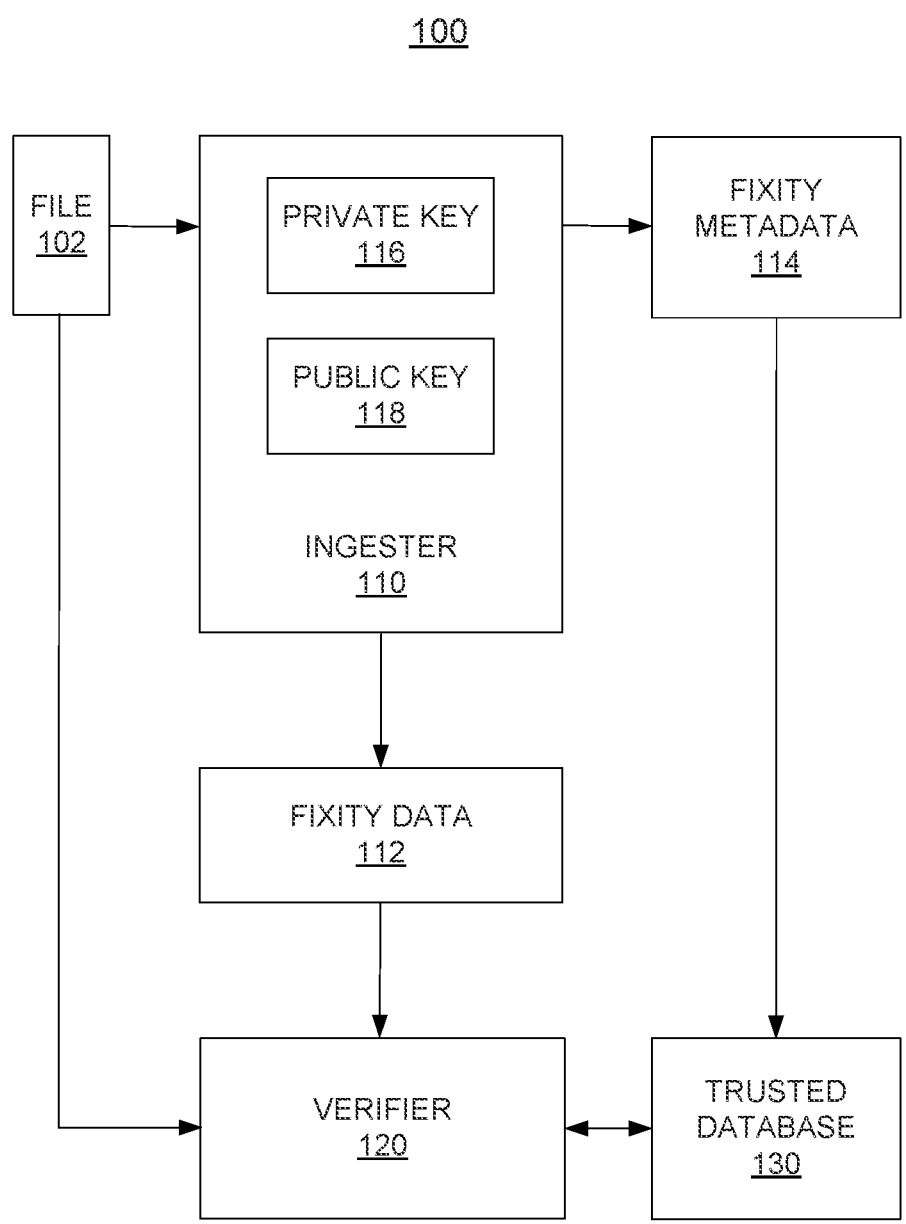
FIG. 1 is a block diagram of a fixity data system in accordance with one implementation of the present disclosure.

FIG. 1 is a block diagram of a fixity data system 100 in accordance with one implementation of the present disclosure. In the illustrated implementation of FIG. 1, the fixity data system 100 includes an ingester 110, a verifier 120, and a trusted database 130. The ingester 110 includes a private key 116 and a public key 118. The ingester 110 receives and processes the file 102 to create fixity data 112 and a subset of information called fixity metadata 114. In one implementation, the trusted database 130 is a blockchain.

In one implementation, the ingester 110 processes the file 102 by slicing it 102 into several parts {$P_0$, $P_1$, . . . , $P_n$}, where each part ($P_x$) may have a different length. The ingester 110 then calculates a digest ($H_i$) of each part $P_x$ as follows:

$$\forall i \in \{1 \ldots n\}, H_i = \text{hash}(P_i), \quad [1]$$

where hash( ) is a hash function.

Once the ingester 110 calculates all digests, it calculates the master hash (MH) as follows:

$$MH = \text{hash1}(H_1 | \ldots | H_n), \quad [2]$$

where hash1( ) is a hash function and
symbol | represents concatenating two parts.

After the master hash (MH) is calculated, the ingester 110 calculates the master hash signature (SMH) as follows:

$$SMH = \text{Sign}_{\{K_{pri}\}}(MH), \quad [3]$$

where $K_{pri}$ is the private key, and
Sign is a digital signature.

In one implementation, the ingester 110 generates the fixity data 112 as the set of digests, master hash (MH), master hash signature (SMH), and the public key 118 (i.e., {{$H_1$, $H_2$, . . . $H_n$}, MH,SMH, $K_{pub}$}). The ingester 110 stores the master hash (MH), the master hash signature (SMH), the public key 118, and the identification of the file 102 as the fixity metadata 114 in the trusted database 130.

Figure 2A:
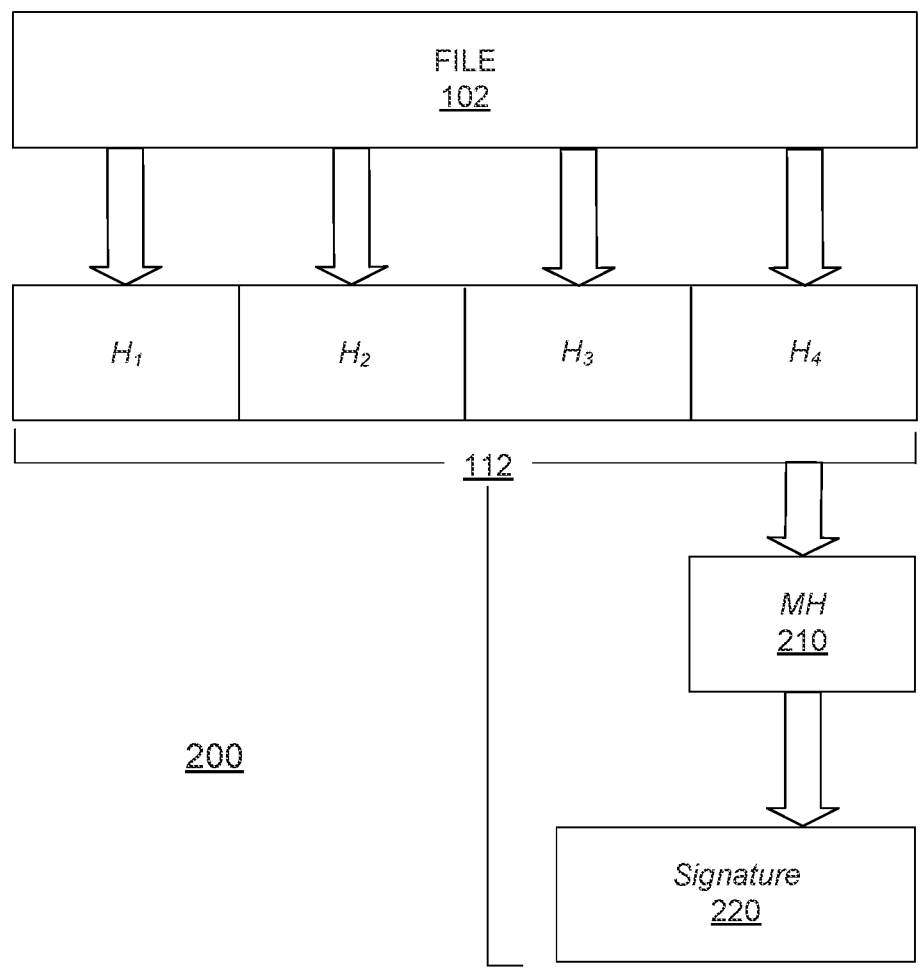
FIG. 2A is a diagram illustrating a fixity data processing in accordance with one implementation of the present disclosure.

FIG. 2A is a diagram illustrating a fixity data processing 200 in accordance with one implementation of the present disclosure. In one implementation, the fixity data processing 200 includes processing the file 102 and the fixity data 112. To verify that part $P_i$ has not been impaired, following checks are performed (e.g., by the verifier 120):

(a) whether MH==hash($HR_1$| . . . |$HR_n$) is true,
where MH 210 is master hash;
(b) whether Versign$_{\{K_{pub}\}}$(MH,SMH) is true,
where $K_{pub}$ is the public key provided by fixity data,
Versign is the verification of digital signature;
(c) whether $H_i$==$HR_i$ is true,
where $H_i$ is the digest of part $H_i$ as defined by (1).

The verification succeeds if all three checks (a), (b), and (c) made by the verifier 120 pass.

In one implementation, the verifier 120 also sends an inquiry to the trusted database 130 whether the master hash signature (SMH) 220 matches the SMH stored in the trusted database 130. The trusted database 130 compares the received result with the fixity metadata 114 and returns to the verifier 120 that the file 102 is pristine when the comparison is positive. Since the SMH is cryptographically protected from an attacker by using a private key to sign the master hash, the attacker is not able to forge a valid signature. Therefore, it is possible to verify one part's fixity without access to the entire file while still proving that the verified part belongs to the complete file. In one implementation, the trusted database 130 is a blockchain.

Figure 2B:
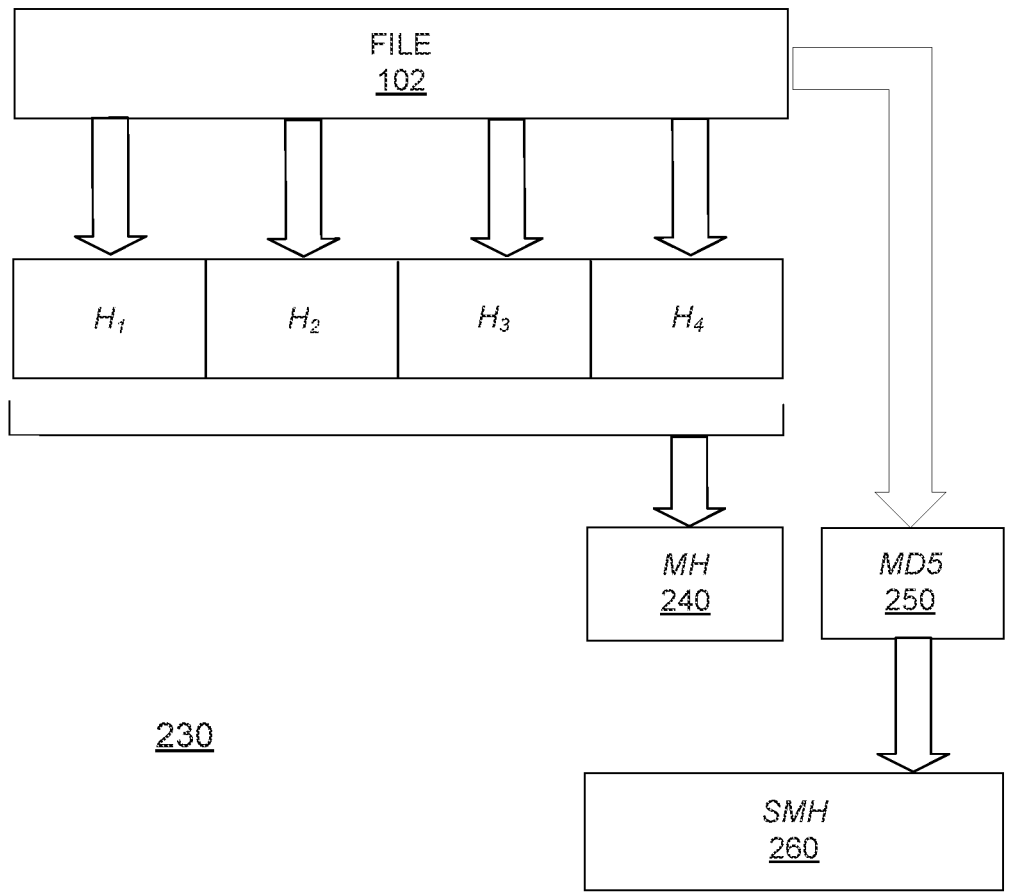
FIG. 2B is a diagram illustrating a trusted rooted fixity processing in accordance with one implementation of the present disclosure.

FIG. 2B is a diagram illustrating a trusted rooted fixity processing 230 in accordance with one implementation of the present disclosure. In one implementation, a trusted rooted fixity processing 230 may be used when creating fixity data from a file that already has a Message Digest 5 (MD5) hash. In this implementation, the rooted fixity processing proves the following:

(a) the corresponding file presents a valid fixity;
(b) the corresponding file is a genuine copy of a file with a given MD5.

Thus, the trusted rooted fixity processing 230 links the MD5 of a legacy file to the new format. For example, the rooted fixity processing 230 securely links the MD5 of a master on a Linear Tape-Open (LTO) to a file in the cloud. Accordingly, the difference between the trusted rooted fixity processing 230 and the fixity data processing 200 in FIG. 2A is in the master hash signature (SMH) 260, which encompasses both the master hash 240 and the legacy MD5 hash 250. The following equation defines SMH:

$$SMH=Sign_{\{K_{pri}\}}(MH|MD5).  \quad [4]$$

In one implementation, the digest function is xxhash64, the master hash digest is SHA256 and the digital signature is RSA-2048 of the hashed value. An X509 certificate encapsulates the public key. Thus, in this implementation, the equations [3] and [4] are replaced by $$SMH=RSA_{\{K_{pri}\}}(SHA256(MH)),  \quad [5]$$

$$SMH=RSA_{\{K_{pri}\}}(SHA256(MH|MD5)).  \quad [6]$$

The fixity data is a file containing at least the following fields:

(a) Rooted is a Boolean value, which is true if the file described a rooted fixity;
(b) Parts is an array of metadata, where each metadata describes one part of the content ($P_i$), the first part being the first element of the array and holding at least: 'Size' that defines the number of bytes of the part; and 'Hash' that is the 64-bit digest of the part (i.e., $H_i$);
(c) MasterHash is the 256-bit master hash;
(d) SignClear is the master hash signature in its binary form;
(e) PEMClear is the PEM-encoded public key; and
(f) MD5 hash is the 16-byte MD5 hash used for rooted fixity, which is meaningful only if Rooted is true.

Figure 3A:
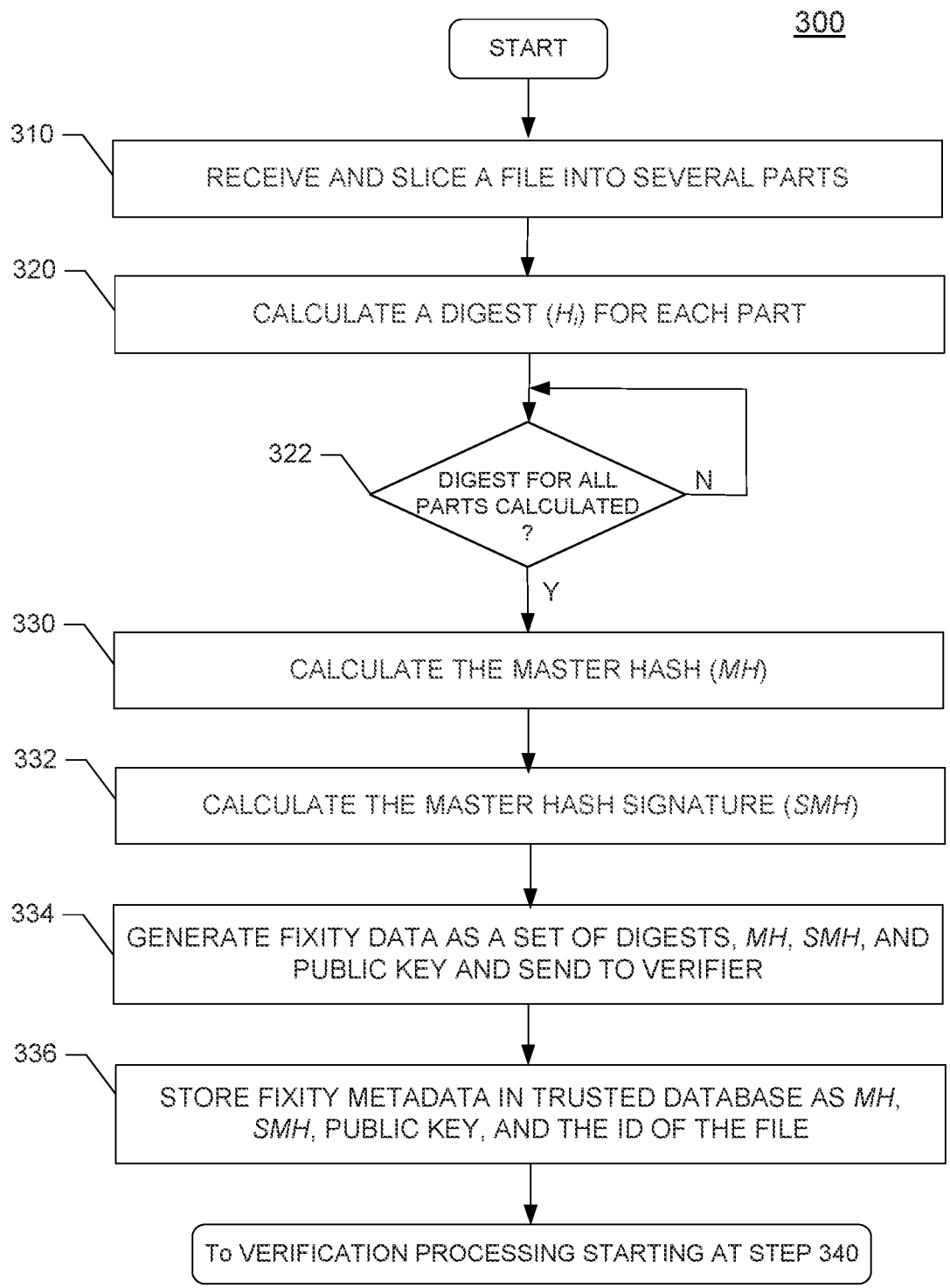
FIG. 3A is a flow diagram of a method for fixity data processing in accordance with one implementation of the present disclosure.
Figure 3A:
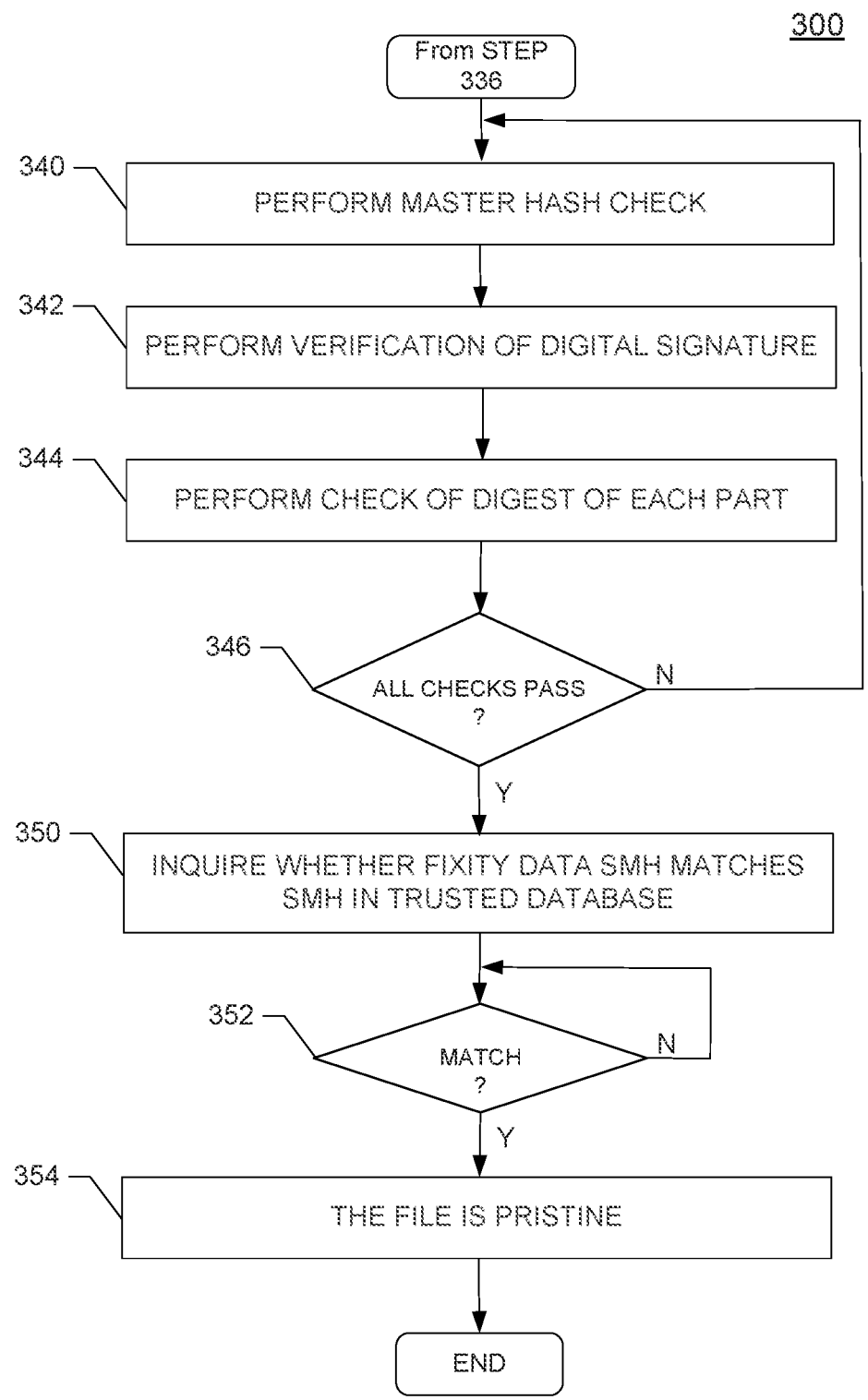

FIG. 3A is a flow diagram of a method 300 for fixity data processing in accordance with one implementation of the present disclosure. In the illustrated implementation of FIG. 3A, a file 102 is received and processed, at step 310, by slicing it 102 into several parts $\{P_0, P_1, \ldots, P_n\}$, where each part ($P_x$) may have a different length. A digest ($H_i$) of each part $P_c$ is calculated, at step 320, as follows:

$$\forall i \in \{1 \ldots n\}, H_i = hash(P_i),$$

where hash( ) is a hash function.

Once it is determined, at step 322, that digests for all parts have been calculated, the master hash (MH) is calculated, at step 330, as follows:

$$MH=hash1(H_1|\ldots|H_n).$$

After the master hash (MH) is calculated, the master hash signature (SMH) is calculated, at step 332, as follows:

$$SMH=Sign_{\{K_{pri}\}}(MH),$$

where $K_{pri}$ is the private key, and
Sign is a digital signature.

In one implementation, the fixity data 112 is generated, at step 334, as a set of digests, master hash (MH), master hash signature (SMH), and the public key 118 (i.e., $\{\{HR_0, HR_1, \ldots, HR_n\}, MH, SMH, K_{pub}\}$). The generated fixity data 112 is sent to the verifier 120 for verification processing. Further, the fixity metadata 114 is stored in the trusted database 130, at step 336, as the master hash (MH), the master hash signature (SMH), the public key 118, and the identification of the file 102. In one implementation, the trusted database 130 is a blockchain.

In one implementation, the method 300 for fixity data processing includes verification processing to verify that part $P_i$ has not been impaired, following checks are performed:

(at step 340) whether $MH=hash1(HR_1|\ldots|HR_n)$ is true, where MH 210 is master hash;
(at step 342) whether $Versign_{\{K_{pub}\}}(MH,SMH)$ is true, where $K_{pub}$ is the public key provided by fixity data, Versign is verification of digital signature;
(at step 344) whether $H_i=HR_i$ is true, where $H_i$ is the digest of part $H_i$ as defined by [1].

The verification succeeds if it is determined, at step 346, that all three checks made at steps 340, 342, and 344 pass.

In one implementation, an inquiry is sent to the trusted database 130, at step 350, to determine whether the master hash signature (SMH) 220 matches the SMH stored in the trusted database 130. The received result is compared, at step 352, with the fixity metadata 114 and a determination is made, at step 354, that the file 102 is pristine when the comparison is positive. Since the SMH is cryptographically protected from an attacker by using a private key to sign the master hash, the attacker is not able to forge a valid signature. Therefore, it is possible to verify one part's fixity without access to the entire file while still proving that the verified part belongs to the complete file. In one implementation, the trusted database 130 is a blockchain.

Figure 3B:
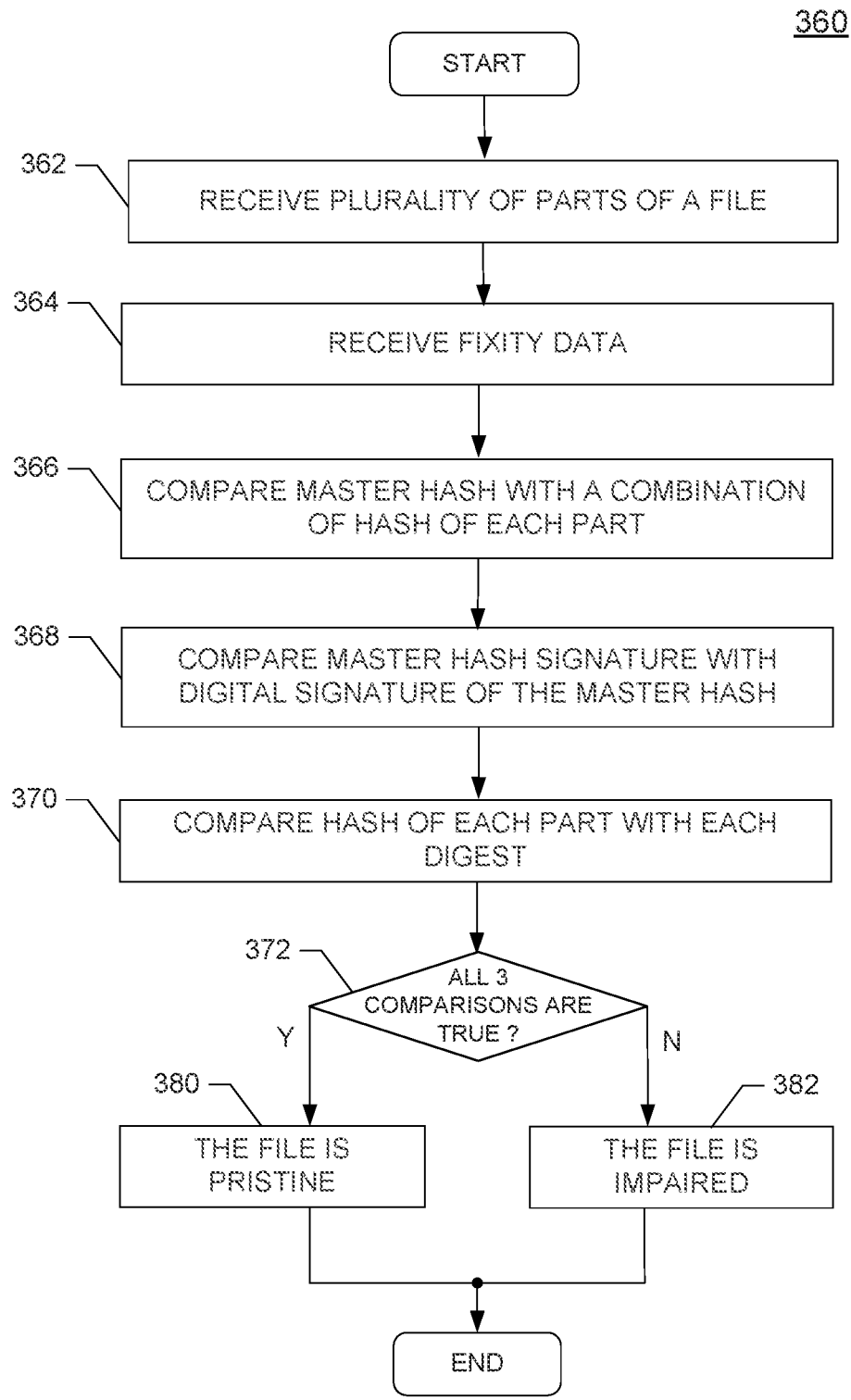
FIG. 3B is a flow diagram of a method for verifying that a file is a pristine copy of a same file that an ingester prepared in accordance with one implementation of the present disclosure.

FIG. 3B is a flow diagram of a method 360 for verifying that a file is a pristine copy of a same file that an ingester prepared in accordance with one implementation of the present disclosure. In the illustrated implementation of FIG. 3B, the method includes receiving a plurality of parts of the file, at step 362. At step 364, fixity data including a set of digests of a plurality of parts, a master hash, a master hash signature, and a public key of the ingester, is received. The master hash in the fixity data is compared, at step 366, with a combination of hash of each part. The master hash signature in the fixity data is then compared, at step 368, with a digital signature of the master hash calculated using the public key of the ingester. A hash of each part is compared, at step 370, with each digest. The file is declared, at step 380, as pristine and not impaired when all three comparisons produce true results, at step 372. The file is declared, at step 382, as impaired when not all three comparisons produce true results, at step 372.

Figure 4A:
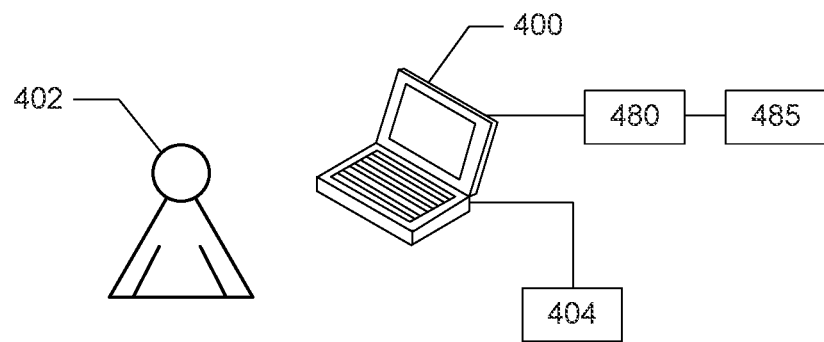
FIG. 4A is a representation of a computer system and a user in accordance with an implementation of the present disclosure.

FIG. 4A is a representation of a computer system 400 and a user 402 in accordance with an implementation of the present disclosure. The user 402 uses the computer system 400 to implement an application 490 for fixity data processing as illustrated and described with respect to the system 100 in FIG. 1 and the methods 300, 360 in FIGS. 3A and 3B.

Figure 4B:
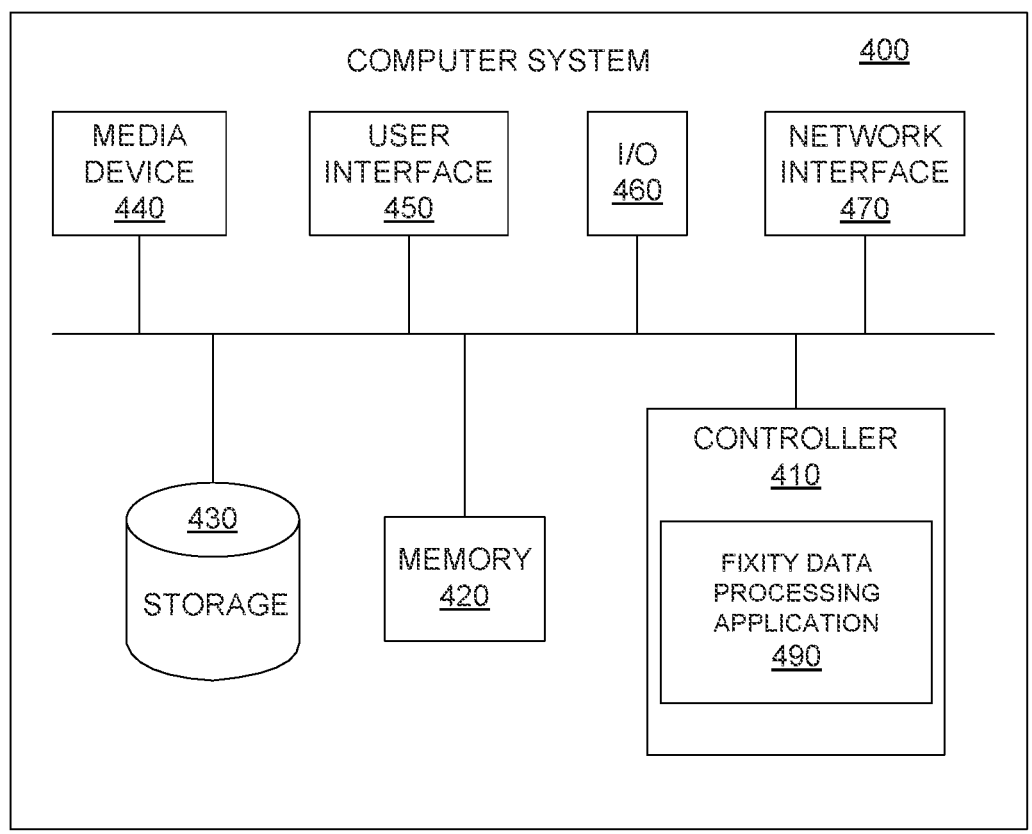
FIG. 4B is a functional block diagram illustrating the computer system hosting the fixity data processing application in accordance with an implementation of the present disclosure.

The computer system 400 stores and executes the fixity data processing application 490 of FIG. 4B. In addition, the computer system 400 may be in communication with a software program 404. Software program 404 may include the software code for the fixity data processing application 490. Software program 404 may be loaded on an external medium such as a CD, DVD, or a storage drive, as will be explained further below.

Furthermore, the computer system 400 may be connected to a network 480. The network 480 can be connected in various different architectures, for example, client-server architecture, a Peer-to-Peer network architecture, or other type of architectures. For example, network 480 can be in communication with a server 485 that coordinates engines and data used within the fixity data processing application 490. Also, the network can be different types of networks. For example, the network 480 can be the Internet, a Local Area Network or any variations of Local Area Network, a Wide Area Network, a Metropolitan Area Network, an Intranet or Extranet, or a wireless network.

FIG. 4B is a functional block diagram illustrating the computer system 400 hosting the fixity data processing application 490 in accordance with an implementation of the present disclosure. A controller 410 is a programmable processor and controls the operation of the computer system 400 and its components. The controller 410 loads instructions (e.g., in the form of a computer program) from the memory 420 or an embedded controller memory (not shown) and executes these instructions to control the system, such as to provide the data processing. In its execution, the controller 410 provides the fixity data processing application 490 with a software system. Alternatively, this service can be implemented as separate hardware components in the controller 410 or the computer system 400.

Memory 420 stores data temporarily for use by the other components of the computer system 400. In one implementation, memory 420 is implemented as RAM. In one implementation, memory 420 also includes long-term or permanent memory, such as flash memory and/or ROM.

Storage 430 stores data either temporarily or for long periods of time for use by the other components of the computer system 400. For example, storage 430 stores data used by the fixity data processing application 490. In one implementation, storage 430 is a hard disk drive.

The media device 440 receives removable media and reads and/or writes data to the inserted media. In one implementation, for example, the media device 440 is an optical disc drive.

The user interface 450 includes components for accepting user input from the user of the computer system 400 and presenting information to the user 402. In one implementation, the user interface 450 includes a keyboard, a mouse, audio speakers, and a display. The controller 410 uses input from the user 402 to adjust the operation of the computer system 400.

The I/O interface 460 includes one or more I/O ports to connect to corresponding I/O devices, such as external storage or supplemental devices (e.g., a printer or a PDA). In one implementation, the ports of the I/O interface 460 include ports such as: USB ports, PCMCIA ports, serial ports, and/or parallel ports. In another implementation, the I/O interface 460 includes a wireless interface for communication with external devices wirelessly.

The network interface 470 includes a wired and/or wireless network connection, such as an RJ-45 or "Wi-Fi" interface (including, but not limited to 802.11) supporting an Ethernet connection.

The computer system 400 includes additional hardware and software typical of computer systems (e.g., power, cooling, operating system), though these components are not specifically shown in FIG. 4B for simplicity. In other implementations, different configurations of the computer system can be used (e.g., different bus or storage configurations or a multi-processor configuration).

In one implementation, the system 100 is a system configured entirely with hardware including one or more digital signal processors (DSPs), general purpose microprocessors, application specific integrated circuits (ASICs), field programmable gate/logic arrays (FPGAs), or other equivalent integrated or discrete logic circuitry. In another implementation, the system 100 is configured with a combination of hardware and software.

The description herein of the disclosed implementations is provided to enable any person skilled in the art to make or use the present disclosure. Numerous modifications to these implementations would be readily apparent to those skilled in the art, and the principals defined herein can be applied to other implementations without departing from the spirit or scope of the present disclosure. Thus, the present disclosure is not intended to be limited to the implementations shown herein but is to be accorded the widest scope consistent with the principal and novel features disclosed herein.

Those of skill in the art will appreciate that the various illustrative modules and method steps described herein can be implemented as electronic hardware, software, firmware or combinations of the foregoing. To clearly illustrate this interchangeability of hardware and software, various illustrative modules and method steps have been described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the present disclosure. In addition, the grouping of functions within a module or step is for ease of description. Specific functions can be moved from one module or step to another without departing from the present disclosure.

All features of the above-discussed examples are not necessarily required in a particular implementation of the present disclosure. Further, it is to be understood that the description and drawings presented herein are representative of the subject matter that is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A method for fixity data processing of a file by an ingester, the method comprising:
   receiving and processing the file by slicing the file into a plurality of parts;
   calculating a digest of each part until digests of all of the plurality of parts have been calculated;
   calculating a master hash as a combination of the digests of all of the plurality of parts;
   calculating a master hash signature using the master hash and a private key of the ingester;
   forming a fixity data including a set of digests which includes digests of all of the plurality of parts, the master hash, the master hash signature, and a public key of the ingester;
   sending the fixity data to a verifier; and
   storing, in a trusted database, a fixity metadata including the master hash, the master hash signature, the public key of the ingester, and an identifier of the file.

2. The method of claim 1, further comprising:
first comparing the master hash in the fixity data with a combination of hash of each part;
second comparing the master hash signature in the fixity data with a digital signature of the master hash calculated using the public key;
third comparing a hash of each part with each of the set of digests;
declaring the file as pristine and not impaired when all three comparisons produce true results.

3. The method of claim 2, further comprising
requesting to verify that the master hash signature of the fixity metadata stored in the trusted database matches the master hash signature in the fixity data.

4. The method of claim 2, wherein the first comparing comprises
determining whether MH==hash ($HR_1$ | ... | $HR_n$ is true, wherein MH is the master hash and $HR_i$ is the digest stored in the database of the $i^{th}$ part.

5. The method of claim 2, wherein the second comparing comprises
determining whether $Versign_{\{K_{pub}\}}$(MH, SMH) is true, wherein $K_{pub}$ is the public key provided by fixity data, Versign is verification of digital signature.

6. The method of claim 2, wherein the third comparing comprises
determining whether $H_i$==$HR_i$ is true, wherein $H_i$ is the digest of each part and $HR_i$ is the digest stored in the database of the $i^{th}$ part.

7. The method of claim 1, wherein the master hash is calculated as MH=hash1($H_1$ | ... | $H_n$, wherein hash1 ( ) is a hash function and symbol | represents concatenating two parts.

8. The method of claim 1, wherein the master hash signature is calculated as SMH=$Sign_{\{K_{pri}\}}$(MH), wherein $K_{pri}$ is the private key of the ingester, and Sign is a digital signature.

9. The method of claim 1, further comprising
sending an inquiry to the trusted database to determine whether the master hash signature in the fixity data matches the master hash signature in the fixity metadata.

10. The method of claim 1, wherein the trusted database is a blockchain.

11. A method for verifying that a file is a pristine copy of a same file that an ingester prepared, the method comprising:
receiving a plurality of parts of the file;
receiving a fixity data including a set of digests of a plurality of parts, a master hash, a master hash signature, and a public key of the ingester;
first comparing the master hash in the fixity data with a combination of hash of each part;
second comparing the master hash signature in the fixity data with a digital signature of the master hash calculated using the public key of the ingester;
third comparing a hash of each part with each digest; and
declaring the file as pristine and not impaired when all three comparisons produce true results.

12. The method of claim 11, wherein the plurality of parts of the file is generated by slicing the file into parts.

13. The method of claim 11, wherein each digest of the set of digests is calculated as the hash of each part.

14. The method of claim 11, wherein the master hash is calculated as a combination of the set of digests.

15. The method of claim 11, wherein the master hash signature is calculated using the master hash and a private key of the ingester.

16. The method of claim 15, wherein the master hash signature is calculated as SMH=$Sign_{\{K_{pri}\}}$(MH), wherein $K_{pri}$ is the private key of the ingester, and Sign is a digital signature.

* * * * *